(12) United States Patent
Owen et al.

(10) Patent No.: US 6,697,151 B2
(45) Date of Patent: Feb. 24, 2004

(54) MATERIAL INSPECTION

(75) Inventors: Mark Owen, Beaverton, OR (US); Adrian Boyle, Monasterevin (IE); Peter Conlon, Dublin (IE)

(73) Assignee: MV Research Limited, Dublin (IE)

( * ) Notice: Subject to any disclaimer, the term of this patent is extended or adjusted under 35 U.S.C. 154(b) by 2 days.

(21) Appl. No.: 09/970,163

(22) Filed: Oct. 2, 2001

(65) Prior Publication Data

US 2002/0053589 A1 May 9, 2002

Related U.S. Application Data

(63) Continuation of application No. PCT/IE00/00030, filed on Apr. 7, 2000.

(30) Foreign Application Priority Data

Apr. 7, 1999 (IE) ................................................. 990282

(51) Int. Cl.[7] ............................................... G01N 21/88
(52) U.S. Cl. ................................. 356/237.1; 356/237.2
(58) Field of Search ........................... 356/237.1–237.5; 382/143, 144, 149

(56) References Cited

U.S. PATENT DOCUMENTS

| | | | |
|---|---|---|---|
| 4,679,938 A | * 7/1987 | Flamholz | 356/237.2 |
| 4,772,125 A | 9/1988 | Yoshimura et al. | 356/237 |
| 4,816,686 A | * 3/1989 | Hara et al. | 250/458.1 |
| 5,108,024 A | * 4/1992 | Kazem-Goudarzi et al. | 228/104 |
| 5,216,479 A | * 6/1993 | Dotan et al. | 356/73 |
| 5,621,811 A | * 4/1997 | Roder et al. | 382/147 |
| 5,820,697 A | 10/1998 | Hamilton et al. | 148/23 |
| 5,978,093 A | * 11/1999 | Abrahamson | 356/401 |

FOREIGN PATENT DOCUMENTS

CH 609777 3/1979

OTHER PUBLICATIONS

IBM Technical Disclosure Bulletin, vol. 28, No. 5, Oct. 5, 1985, pp. 2014–2015.

* cited by examiner

Primary Examiner—Zander V. Smith
(74) Attorney, Agent, or Firm—Jacobson Holman PLLC

(57) ABSTRACT

An inspection station (6) has a ring of 370 nm LEDs (24) for low-angle diffuse illumination of flux. This stimulates inherent fluorescent emission of the flux without the need for flux additives or pre-treatment. A CCD sensor (20) detects the emission. An image processor generates output data indicating flux volume according to a relationship between emission intensity and volume over the surface of the flux. Intensity non-uniformity indicates either height non-uniformity or hidden voids, both of which give rise to defects after application of solder paste and reflow. The inspection is particularly effective for pre solder application flux inspection.

27 Claims, 7 Drawing Sheets

Emission Intensity as a Function of Sample Thickness

MATERIAL INSPECTION

This is a continuation of PCT/IE00/00030 filed Apr. 7, 2000 and published in English.

FIELD OF THE INVENTION

The invention relates to inspection of dielectric materials used in the electronics industry such as flux on its own or in solder paste.

PRIOR ART DISCUSSION

Such materials are used in two main branches of the electronics industry, namely (a) surface mount technique (SMT) circuit production processes and (b) chip scale packaging (CSP).

The CSP branch includes ball grid array (BGA) and flip-chip processes. In BGA processes an array of solder balls is deposited on a substrate which was previously coated with flux. The flux, when heated during the reflow process, improves the cleanliness of the resulting solder joint as well as improving the mechanical and electrical connectivity between the solder and the pad to which it is soldered. In flip-chip packaging, a solder mask covers a copper substrate to reveal an array of spots at which the copper is exposed. Flux is applied over the mask and a flip-chip having an array of balls on a lower surface is deposited onto the substrate with the balls in registry with the mask spots. In both BGA and flip-chip processes the solder is reflowed afterwards to complete the package.

A further branch is now emerging, namely circuit production processes using adhesives. This avoids the need for use of solder and therefore flux is also not required. Ultraviolet (UV) light is used for curing the adhesive.

In the above processes, both chip-scale and circuit-scale, various techniques are used for application of a dielectric material such as flux, solder paste incorporating flux, or adhesives. These techniques include stencil printing, pin transfer, dispensing, dipping, and jetting. Whichever technique is used, there are very stringent requirements to be met to ensure good quality chip or circuit production, and the stringency arises particularly because of the ever-decreasing scales involved. The following summarises some of the more important requirements.

Tack—Apply enough flux to retain solder balls from 300–762 $\mu$m in place during reflow.

Solderability—Apply enough flux to remove oxides on the solder balls and board pads.

Residues—Limit residues by applying an appropriate amount of flux which will activate and burn off during reflow.

Barrier Effect—Apply flux such that a "flux barrier effect" which blocks the seating and soldering of solder balls or array components does not occur.

Contamination—Apply a controlled amount of flux such that smears, contamination with the surrounding solder mask, and blockages in the stencil are avoided.

Process Capability—Apply a repeatable quantity of flux despite ambient variations.

Flux thickness is related to the number of missing balls at reflow and to occurrence of voids in paste. Voids in solder balls are in turn linked to reduction in joint reliability and they affect the joint high frequency signal propagation. Excess flux can also interact with solder mask to cause excessive residues and increase migration between adjacent solder joints. Defect rates at ball attach also have been shown to increase with increasing flux thickness. For flip chip soldering, a 20 micron minimum and 50 micron nominal flux thickness is recommended based on solder ball coplanarity specifications and the solder ball height.

Meeting quality standards is often complicated by various attributes of the dielectric material. For example, flux is a non-Newtonian liquid. Therefore, its viscosity changes with the speed with which it is worked, and also temperature and humidity. Also, in screen printing, there is a tendency for air bubbles to be worked into the flux.

Clearly, in such environments inspection of the substrate for volume and location of dielectric material is essential. However current inspection methods are often inadequate for measuring to the tolerance required. One inspection problem is that many commercially used solder fluxes are nearly transparent and so conventional machine vision techniques are unreliable.

In another approach, United States Patent Specification No. U.S. Pat. No. 5,820,697 (IBM) describes a method of joining metal surfaces in which there is post-reflow inspection of the solder connection for residual flux. The method involves mixing a water soluble fluorescent dye with a water soluble soldering flux to form a mixture. The metal surfaces are heated to a temperature at which the solder material softens and for a time period to form a solder connection. The solder connection is washed to remove the dye and the flux. The solder connection is then illuminated to cause the dye to fluoresce so that residual flux is detected. This approach may be effective in some situations. However, it suffers from the disadvantage of the requirement to add a fluorescent dye and so it is invasive. Choice of dye is difficult and requires great care because it must not degrade at the temperatures involved and must not have an adverse effect on the flux and circuit materials. Also, mixing of dye adds an additional process step which must be carefully controlled and care must be taken to ensure that the dye does not have an adverse effect on the other materials. Also, this process provides limited quality information, focused on indications of presence or absence of post-reflow flux residues.

OBJECTS OF THE INVENTION

One object is to provide an inspection method and system which provide more comprehensive information about deposition of dielectric materials in the electronics industry.

Another object is that the above is achieved in a non-invasive manner without addition of extra processing steps or addition of an extra material.

SUMMARY OF THE INVENTION

According to the invention, there is provided a method of inspecting a dielectric material deposited on a substrate in an electronics production process, the method comprising the steps of:

(a) directing radiation excitation at the material to cause radiation emission by inherent fluorescence of the material, (b) detecting the emission and determining emission intensity data, and (c) processing said emission intensity data to generate output data indicating volume of the material according to a relationship between said emission intensity and material volume.

In one embodiment, step (b) comprises determining intensity data across the material surface and step (c) comprises generating output data indicating a defect if non-uniformity above a pre-set level occurs over the material surface.

In another embodiment, said output data includes an indication of presence of a void within the material or an unacceptable material height non-uniformity.

In one embodiment, the excitation wavelength is in the range of 320 nm to 390 nm.

In one embodiment, the emission is detected after filtering out radiation outside of an emission wavelength range from a sensor field of view.

In a further embodiment, radiation having a wavelength below 420 nm is filtered out.

In one embodiment, the steps (a) and (b) are carried out simultaneously and there is activation of the excitation only during emission detection.

In one embodiment, the excitation is generated by switching LEDs.

In one embodiment, the duration of excitation is less than 100 ms.

In another embodiment, the duration of excitation is in the range 5 ms to 80 ms.

In one embodiment, the direction of excitation is at an angle of greater than 50° from the sensing axis to minimise sensing of reflected unwanted radiation.

In one embodiment, the angle is between 55° and 80°.

In one embodiment, the method comprises the further steps of directing visible radiation at the material, sensing reflected visible radiation, and using said sensed visible radiation to determine material position with respect to fiducials.

In one embodiment, said visible radiation is generated by near-on-axis LEDs with respect to the sensing axis.

In one embodiment, the dielectric material is solder flux.

In one embodiment, the method is carried out on flux before application of solder.

In a further embodiment, the method comprises the further step of providing in-line process control feedback to a flux dispensing station to avoid downstream processing defects.

In one embodiment, the material is flux deposited on a chip substrate in a BGA or flip chip production process.

In one embodiment, the material is flux deposited on a circuit board in a SMT production process.

In one embodiment, the material is a component adhesive.

According to another aspect, the invention provides an inspection system comprising:

a radiation source for directing radiation excitation at a wavelength to cause inherent fluorescent emission in a dielectric material, a sensor for detecting inherent fluorescent emission, and an image processor comprising means for determining emission intensity data from the detected emission and for generating output data indicating volume of the material according to a relationship between said emission intensity and material volume.

In one embodiment, the radiation source and the sensor are mounted on an inspection head of a robotic gantry system.

In one embodiment, the radiation source is mounted to direct the excitation at an angle of in excess of 50° to the sensor axis.

In one embodiment, the radiation source comprises a ring of LEDs mounted for low-angle diffuse illumination of the material and the sensor is mounted for positioning vertically above the material.

In one embodiment, the system further comprises a filter for blocking non-emission radiation from the sensor.

In a further embodiment, the system further comprises a visible light source, a visible light sensor mounted to sense visible light reflected from the material, and means in the image processor for determining location of the material with respect to fiducials.

In one embodiment, the radiation source comprises means for emitting excitation at a wavelength in the range of 320 nm to 390 nm.

In one embodiment, the image processor is programmed with excitation intensity data derived from monitoring excitation and responsive emission from a standard fluorescent material.

DETAILED DESCRIPTION OF THE INVENTION

BRIEF DESCRIPTION OF THE DRAWINGS

The invention will be more clearly understood from the following description of some embodiments thereof, given by way of example only with reference to the accompanying drawings in which.

DESCRIPTION OF THE EMBODIMENTS

Figure 1:
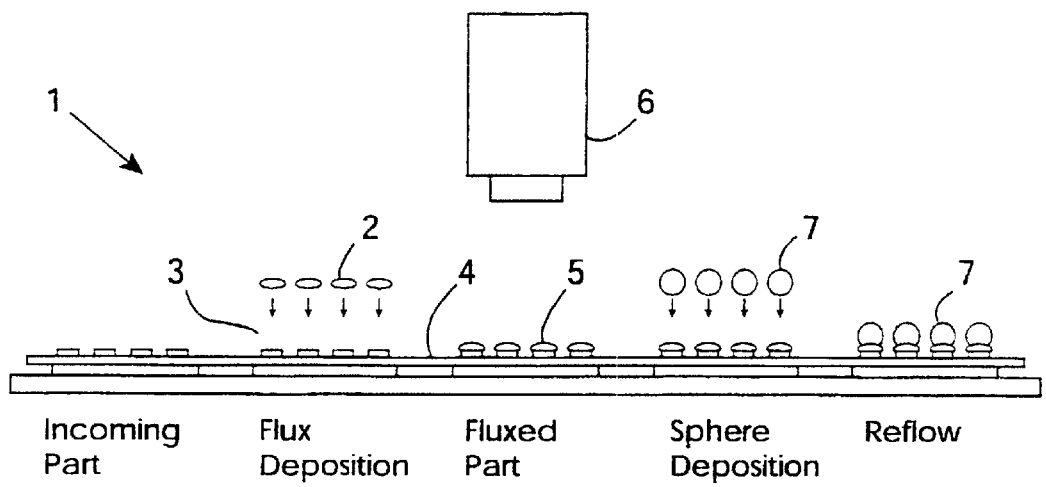
FIG. 1 is a schematic representation of a process flow incorporating an inspection method of the invention.

Referring to FIG. 1 a chip scale packaging (CSP) ball grid array (BGA) process 1 is described. Solder flux 2 is deposited onto conductive pads 3 on a substrate 4. Fluxed conductive pads 5 are inspected by an inspection station 6. This inspection provides detailed in-line information about the manner in which the flux 2 had been deposited. This information provides a strong indication of the likely quality of the downstream processing steps. Balls 7 of solder are then applied onto the fluxed conductive pads 5. Upon reflow, the balls 7 are soldered to the fluxed pads 5.

Figures 2A, 2B, 2C:
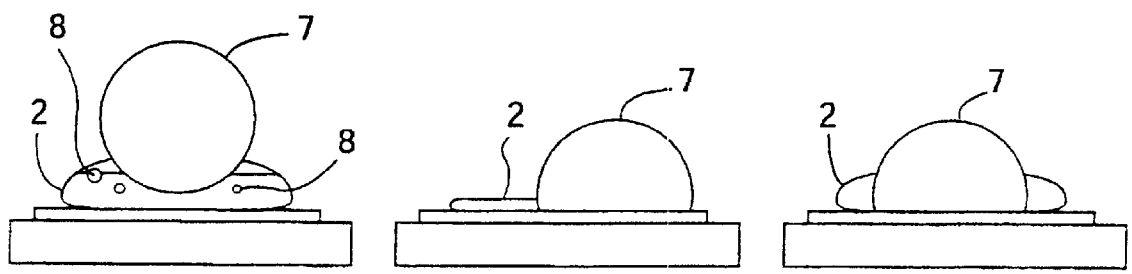
FIG. 2 is a schematic diagram illustrating detected defect types in BGA packaging.

Referring to FIG. 2(a) excess flux 2 results in poor contact between the solder ball 7 and the pad 4 (copper, Ni/Au or other conductor). This results in poor bonding strength and poor electrical conductivity, with a likelihood of short to medium term failure. In addition, the presence of voids 8 can affect the quality of the ball attachment. As shown in FIG. 2(b), insufficient flux 2 can result in the ball 7 moving slightly on the pad 4 prior to reflow and bonding. This can result in an offset error. In addition, insufficient flux can result in a poor quality bond as the conducting pad is unlikely to have been sufficiently cleaned. As shown in FIG. 2(c), the correct amount of solder flux prevents the ball from moving prior to reflow, optimises the cleaning of pad and ball, and allows the ball to make good contact with the pad so that during reflow a good bond is formed.

Figure 3:
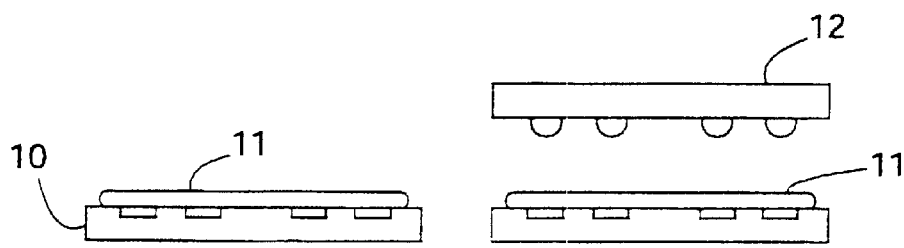
FIG. 3 is a schematic diagram illustrating a flip-chip attachment process incorporating inspection of the invention.
Figure 4:
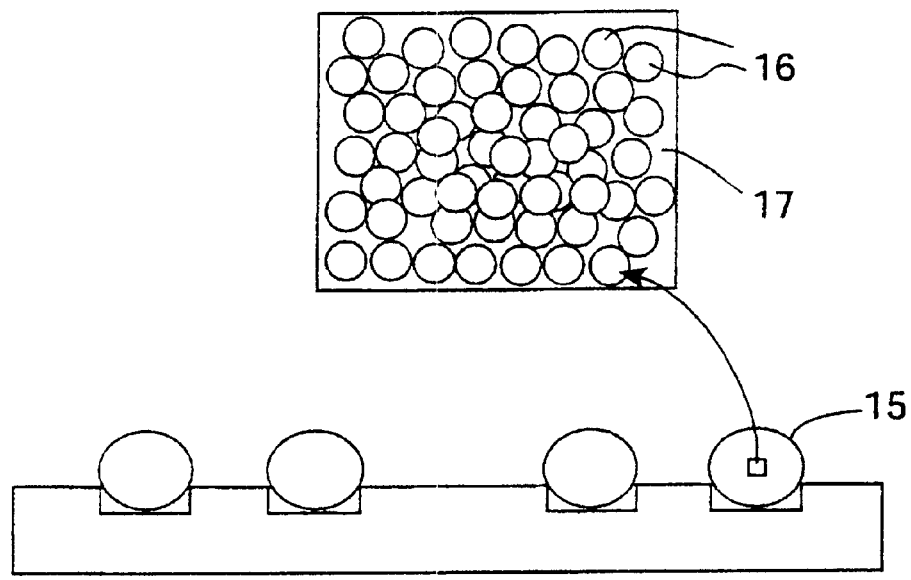
FIG. 4 is a schematic representation of the content of a solder paste.

Referring to FIG. 3, in a flip chip attachment process there is inspection of a masked substrate 10 after application of flux coating 11 and before deposition of a flip chip 12. Again, comprehensive in-line information is obtained so that the flux deposition may be optimised to prevent defects arising in downstream processing steps. This inspection may be carried out also with adhesives used in the electronics production industry and with solder paste 15 of the type shown in FIG. 4, having solder grains 16 dispersed in flux 7.

Figure 5:
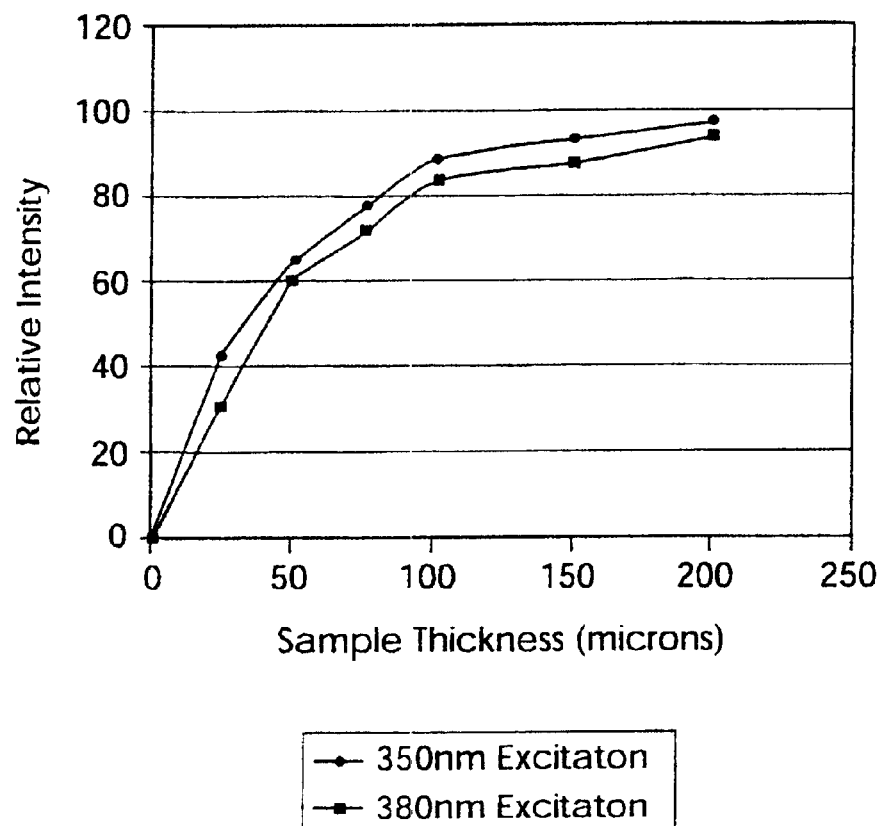
FIG. 5 is a plot illustrating the relationship between emission intensity and sample thickness for inspection.

The inspection involves directing excitation radiation at the material at one wavelength and monitoring intensity of emission radiation at a different wavelength arising because of inherent fluorescence of the target dielectric material. The inspection station is pre-set with the intensity response characteristics for the particular dielectric material and environment. Calibration involves measuring the emission intensity corresponding to known material heights. Referring to FIG. 5 a plot illustrates the relationship between relative intensity of emitted radiation and thickness of a sample of untreated commercially available flux in fixed length fused silica cells. The upper curve is for 350 nm wavelength excitation and the lower curve is for 380 nm wavelength excitation. This set of measurements is based on a sample without voids, and the emission intensity is a function of volume of the dielectric material because voids do not contribute to fluorescence. Voids (air presence) and thickness non-uniformity are detected by presence of a non-uniformity in the emission intensity across the material. This is very important for quality control.

Figure 6A:
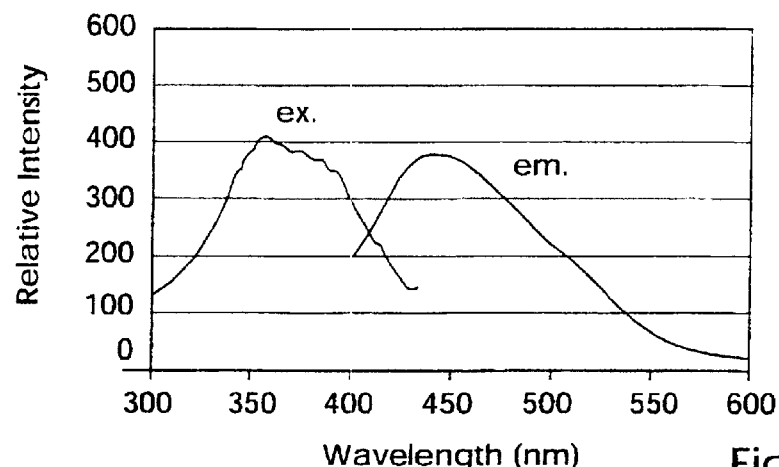
FIGS. 6(a), and 6(b), are plots illustrating excitation and emission wavelengths for inspection.
Figure 6B:
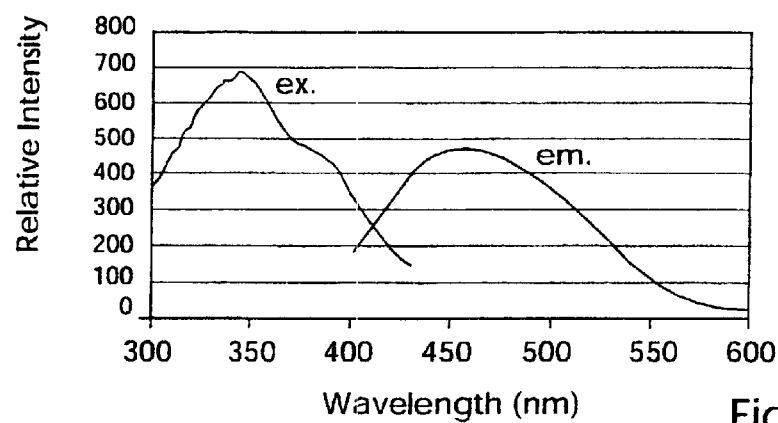
Figure 6C:
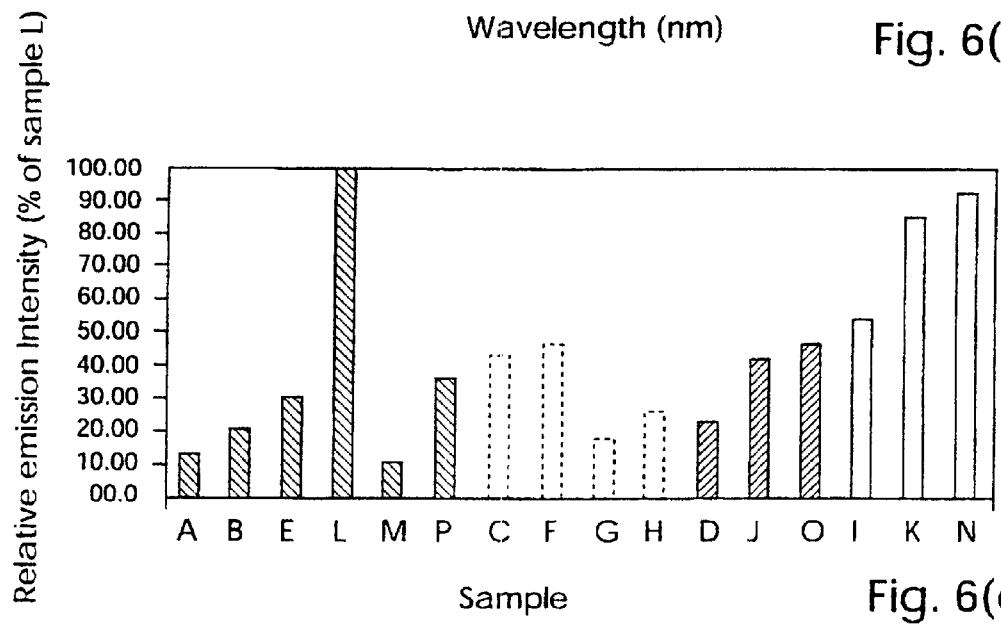
FIG. 6(c) is a plot illustrating relative emission intensities for samples of sixteen commercially available fluxes.

Referring to FIGS. 6(a) and 6(b) relative intensity wavelength plots are shown for both excitation and emission for each of two sample commercially available fluxes. As is clear from these plots excitation with UV radiation in the 320 nm to 390 nm band provides maximum emission intensity. Data for the relative emission intensity for each of sixteen samples of commercially available fluxes is plotted in FIG. 6(c). The excitation wavelength is 370 nm, and as for the other plots, no colorant, dye, or fluorescence was added to the fluxes. The emission wavelengths for all of these samples is in the range 440 to 480 nm.

The fluorescence emission form the solder fluxes tested indicates that the fluorescing species is an ingredient common to the fluxes tested. This is based on the similar shaped spectra that were observed and the small distribution in the excitation maximum range. The recorded shift in the peak wavelengths is likely to be due to local environmental effects such as the concentration of other compounds in the flux. In fluxes containing Rosin, several acids such as abietic acid, isopimaric acid, neoabietic acid, pimaric acid, dihydroabietic acid and dehydroabietic acid exist. These acids are characterized by a carboxyl group, which often contain conjugated bonds. Conjugated chemical bonds result in delocalisation of electrons along the chemical bonds. The extent of this delocalisation determines the electronic and optical properties of the material. The extent of the delocalisation is governed not only by the nature of the chemical structure but also by the nature of the other attached chemical groups and the local environment in which these chemical structure lie. In solder fluxes containing Rosin, the degree of conjugation of such bonds as they appear on the acid groups is affected by the components that make up the solder flux mixture. Conjugated bonding in organic materials are responsible for the fluorescence from fluorescing laser dyes and polymers such as those used in organic polymer LED production. This suggests that the fluorescence in solder flux and similar dielectric materials is due to conjugated bond structures found in the acids. In addition, it is possible that the measured fluorescence intensity is proportional to the acidity and activity of the flux. The observed degradation in the fluorescence intensity with UV exposure also supports this idea. As conjugated bonds absorb UV radiation they degrade and the conjugation decreases.

As the UV light source intensity is critical to the precise determination of the location area and volume of the material, it is necessary to measure the UV light intensity over the illuminated area. This may be performed by moving the light source over a photodetector and recording the light intensity at each position. This allows the uniformity and the average intensity of the UV to be measured. An alternative technique uses a calibrated fluorescing standard plate with emission in the camera sensor spectral sensitivity range. The plate is a calibrated and traceable plate with a linear relationship between the UV intensity and the visible emission over the range of intensities form 0 mW/cm2 to the operating intensity of the UV source at the board height. By moving the camera and lighting head over the plate a map of the intensity over the area is acquired. This information is then processed to determine the average UV intensity to ensure there is no degradation in the light source and to determine if any LEDS (in the case of LED illumination) have failed. The excitation intensity data is stored in the image processor of the inspection station 6 as part of the stored relationship between emission intensity and material volume, the emission being of course related to the excitation intensity.

Figure 7:
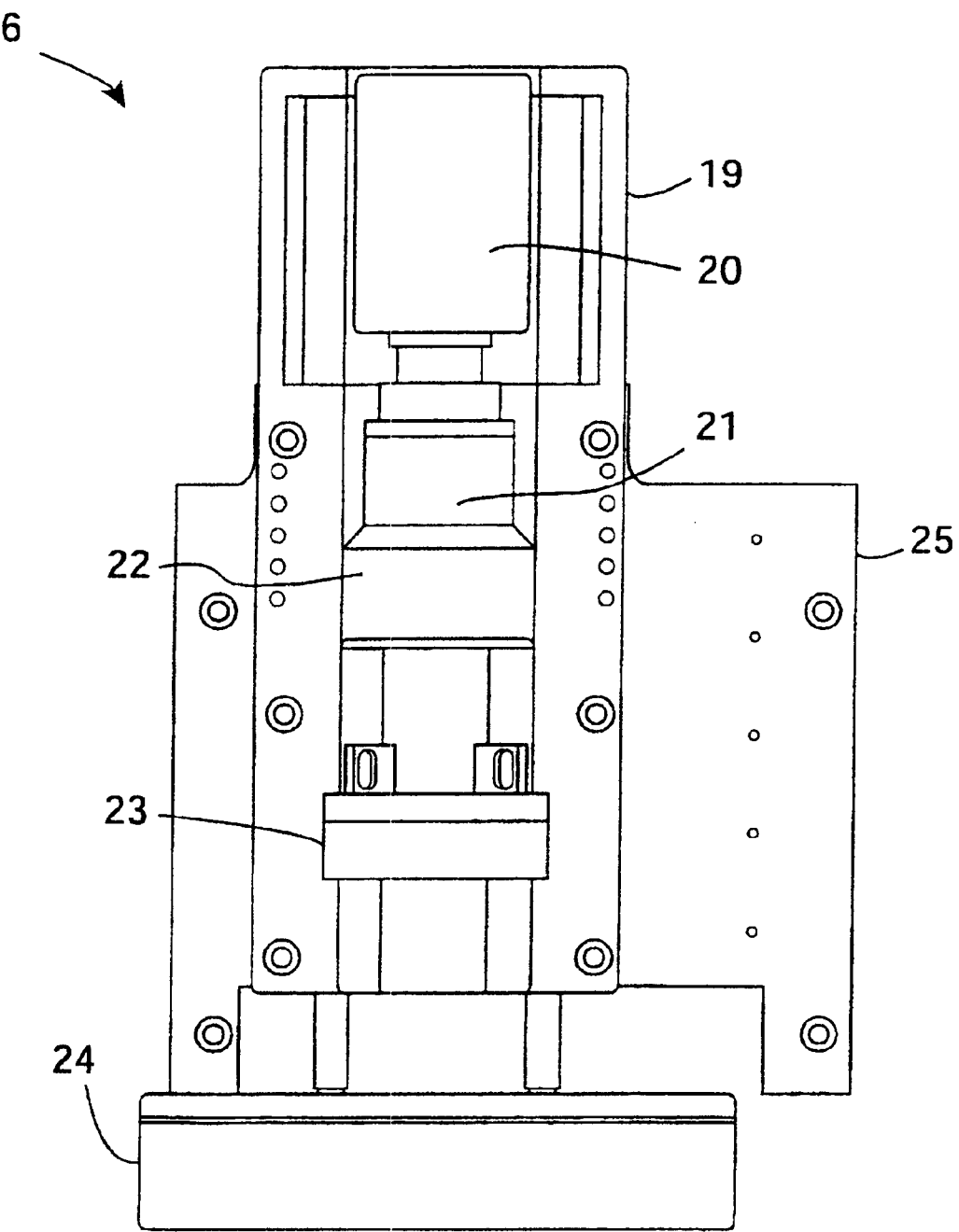
FIG. 7 is a schematic elevational view of an inspection station.

Referring to FIG. 7, the inspection station 6 is described in more detail. The station 6 comprises an inspection head 19 mounted on a robotic gantry system over a target conveyor system, not shown. The head 19 comprises a CCD camera 20 with maximum responsivity in the 400 nm to 500 nm wavelength range, at which the emission is at a maximum. The camera 20 has a lens 21 which is colour corrected to 400 nm to 700 nm and has greater than 90% transmission at these wavelengths. In addition, the head 19 comprises an optical bandpass filter 22 to eliminate wavelengths below 420 nm range. This helps to achieve improved contrast. A ring of red LEDs 23 is mounted for near-on-axis visible illumination of the target. Finally, a lower ring of 150 0.75 mW, 370 nm UV LEDs 24 is mounted beneath the visible light LEDs 23. The ring of LEDs 24 has a larger diameter than the ring of LEDs 23 and they are positioned to provide an angle of incidence of between 10° and 40° to horizontal and preferably 15° to 35° to horizontal (plane of the targets). The angle is in this embodiment 20° to 25°.

The various components of the head 19 are supported on a mounting plate 25, in turn mounted on a robotic gantry system. The camera 20, the LEDs 22, and the LEDs 23 are connected to a controller which directs cameras shutter opening and activation of the LEDs 22 and 23. Activation of the LEDs 24 is simultaneous with shutter opening and is for a period of less than 100 ms, preferably 5 ms to 80 ms. However, prior to this, the LEDs 22 are activated together with the camera 20 for fiducial location (the camera 20 is sensitive to both ranges of wavelengths, but not to wavelengths less than 400 nm).

During activation of the LEDs 24, there is a low-angle diffuse excitation lighting. This achieves excellent contrast because the "tail end" excitation wavelengths of the spectrums shown in FIGS. 6(a) and 6(b) are more reflective and do not reflect within the camera's field of view. On the other hand, the desired radiation in the 320 nm to 390 nm approximate range causes inherent fluorescence and the camera 20 senses the resulting emission on-axis in the field of view as the target is directly under the camera.

In principle, any wavelength in the excitation spectrum may be used to stimulate fluorescence (the entire excitation spectrum). However, the maximum emission intensity is achieved by excitation at the maximum excitation intensity and accordingly, for the fluxes analysed, 370 nm was found to be a good "general" excitation source wavelength.

The relative locations of the flux are determined by use of fidicuals illuminated and sensed by visible lighting provided by the red LEDs 23. As described above, the visible and UV images are obtained with the one cameras 20, however separate cameras may be used with appropriate filters.

Figure 8A:
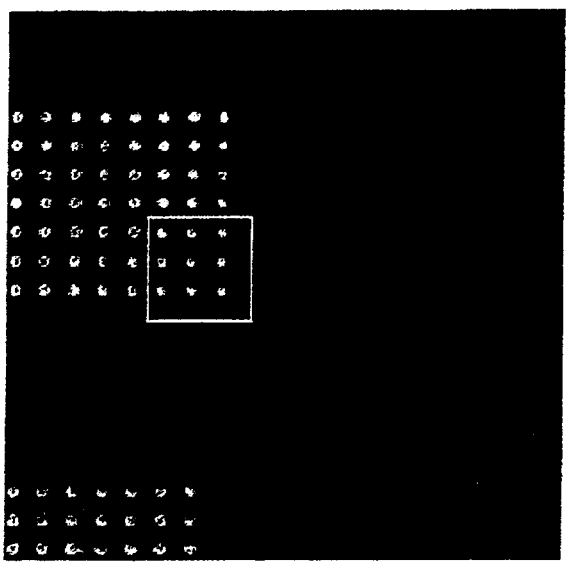
FIGS. 8(a) and 8(b) are images of the same set of solder pads under UV and visible lighting respectively.
Figure 8B:
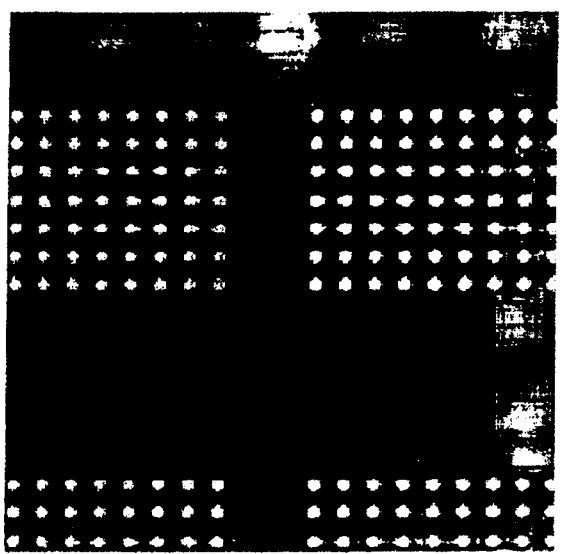

Referring to FIGS. 8(a) and 8(b), a circuit board having Ni/Au pads is shown. The left-hand pads have flux deposited on them, while the right-hand pads have no flux.

The image for UV light excitation and emission detection is shown in FIG. 8(a), while that for visible excitation and emission detection is shown in FIG. 8(b). These images demonstrate the effectiveness of flux detection using the excitation and emission sensing steps of the invention.

When solder flux is placed on electrically conducting (and usually optically reflecting) substrates such as Ni/Au or copper finish the intensity of the fluorescence is proportional to the integrated light intensity emitted from the flux deposit. A number of factors contribute to this signal and these include the absorption and emission properties of the flux, the reflectivity of the emission from the Ni/Au or copper substrate, and the transmission and spectral response of the sensor. All of these factors are calibrated to provide a measured fluorescence intensity proportional to height for the target. Such calibration may be carried out by using a transparent glass cover to form a wedge of flux increasing in thickness from 0 mm to 1 mm over 75 mm. The calibration data may be represented as shown in FIG. 5.

The calibration measurements are made on the basis of there being no voids in the wedge, and hence the actual measurements indicate presence of voids or thickness non-uniformity. These are both faults of substantially equal effect.

The relationship between the thickness of the flux, the excitation intensity, and the absorption co-efficient of the flux is quantified in the Beer Lambert law i.e. $I = I_0 \exp(-al)$, where I is the intensity of light after passing through a material with absorption coefficient alpha (inverse microns) and thickness L (microns), and $I_0$ is the intensity of light where L=0. This indicates that the overall fluorescence emission intensity at a particular position in two-dimension space depends on the strength of the wavelength conversion on the absorption coefficient of the material and also on the volume of the flux deposit.

Figure 9:
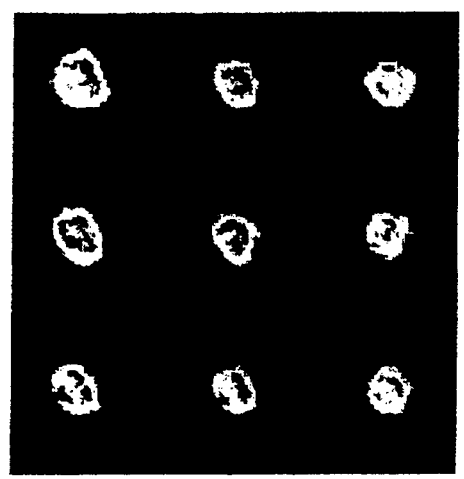
FIG. 9 is a two-dimensional image of nine fluxed pads.
Figure 10:
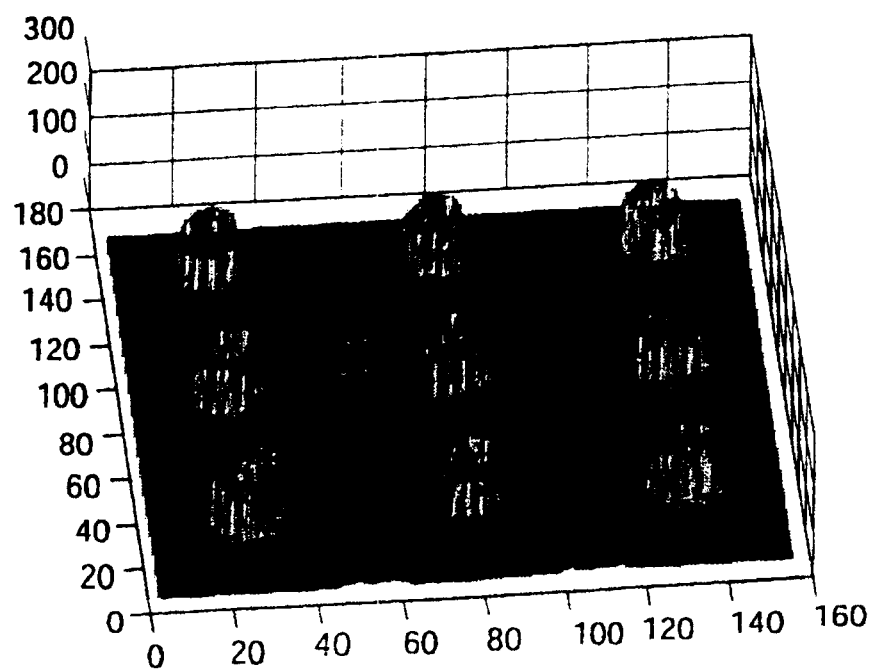
FIG. 10 is a three-dimensional rendering of the flux volumes drawn from intensity of the emissions.

As is clear from FIG. 5, the emission intensity, and therefore the grey level is dependent on the volume of the solder flux, and therefore thickness where there are no voids. The factors affecting this dependence are the aperture setting, excitation intensity, background light level, and the material optical properties. Thus, three dimensional information may be obtained in a two-dimensional grey scale image. Referring to FIG. 9, a two-dimensional zoom of the area in FIG. 8(a) represented by the square enclosing nine pads is shown. FIG. 10 shows a three-dimensional rendering of the flux volumes. This rendering is generated by the intensity in grey levels against the pixel in the X and Y directions.

It has been found that an excitation wavelength in the range of 300 nm to 400 nm is effective, while a value in the range of 320 nm to 390 nm is particularly effective. These excitation wavelengths provide emission wavelengths of between 400 nm and 550 nm, with highest intensities occurring between 420 nm and 480 nm.

The inspection method applies to both circuit (SMT) and chip-scale (CSP) production. For SMT, it may be applied to inspection of flux before application of solder, post-reflow for detection of residual flux, and for inspection of glue where this is used instead of flux and solder or for inspection of paste incorporating flux. However, the inspection is particularly effective and advantageous for pre solder deposition flux inspection.

It is well known that some adhesives require UV exposure to initiate and speed up the cure process. Other adhesives require thermal excitation. The adhesive are generally deposited to thicknesses such that they are partially transparent to visible light making 2D and 3D measurement difficult. For. 3D inspection of fluorescing materials such as flux (described above) and adhesives it required that the absorption coefficient at the excitation wavelength is such that sufficient excitation light is transmitted through the specimen. This in turn depends on the absorption coefficient of the photoinitiator and other absorbers. This is true of all materials and where the penetration of the excitation and emission wavelength is through all of the sample thickness it is possible to determine three dimensional height and volume data on the fluorescing specimen.

For CSP, the invention may be applied to:

inspection of flux before ball deposition, a shown in FIG. 1, inspection of paste incorporating flux, inspection of flux before flip-chip attach, as shown in FIG. 2, and post reflow flux residue inspection.

The inspection method has been found to be particularly effective and repeatable for both circuit-scale and chip-scale inspection.

Figure 11:
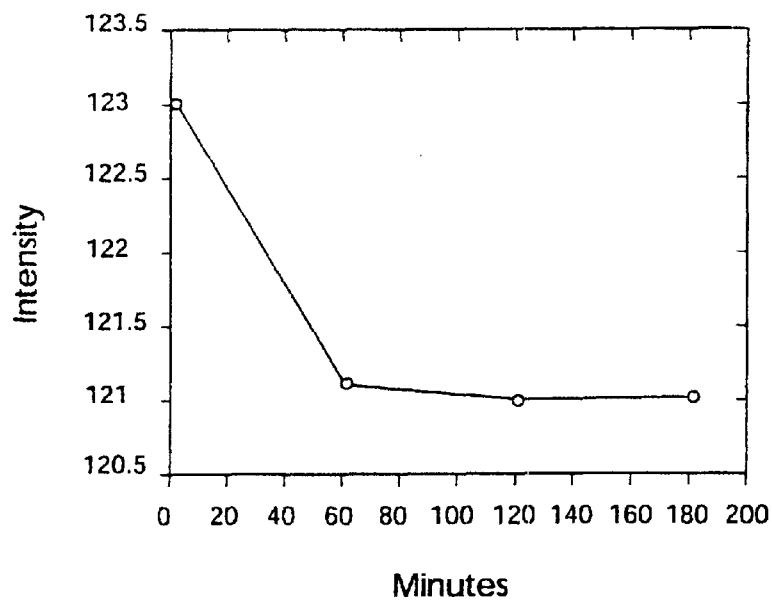
FIG. 11 is a plot indicting reduction of emission with excitation time.
Figure 12:
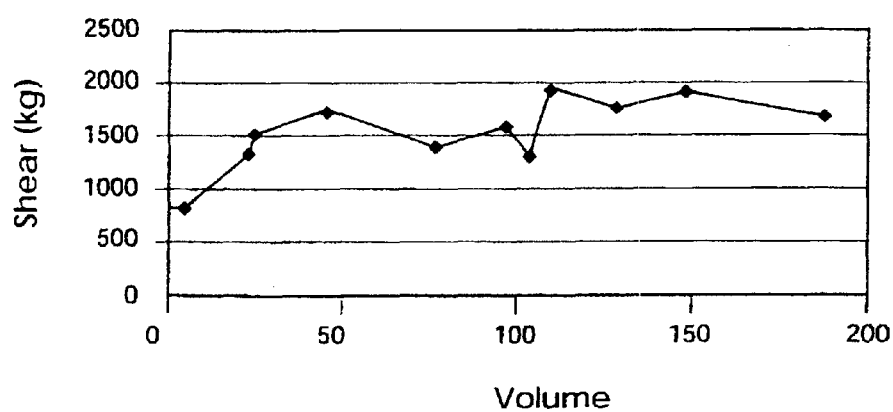
FIG. 12 is a plot indicting the relationship between shear strength and volume.

It has been found that UV exposure over time degrades the properties of the flux that fluoresce. An analysis was done using a arbitrary BGA pad and recording its corresponding intensity over time to evaluate this degradation. Intensity data was taken after a series of inspections of approximately one minute in length i.e. the flux was subject to one minute of UV exposure during an inspection in this case. FIG. 11 summarises the effect of constant UV exposure over 180 mins to average intensity for a pad using the fluxes specified. From the data shown in FIG. 11 it can be inferred that the decay in average intensity is proportional to the length of time that the flux is exposed to UV. To verify this relationship and to investigate the effect of UV exposure on the flux, further trials were conducted. These trials comprised of exposing the flux to UV at increasing time intervals and examining the resulting average intensities. The time interval between each inspection was increased from 10 minutes, to 60 minutes. In each case it was observed that the rate of decay decreases.

Therefore, approximately 300 minutes of constant UV exposure is needed to level off the fluorescent degradation of a given flux. For the purposes of the gage study the flux print was exposed over a 180 minute period to ensure stability in the fluorescence. For standard data collection the exposure time is extremely short (~80 ms per BGA device as calculated during evaluation). Therefore this effect is negligible during online inspection and true values of volume and height can be acquired. To allow accurate comparison between measurement data the flux handling period between deposition and inspection and the exposure time was held constant.

An analysis of variance (ANOVA) technique for establishing gage repeatability and reliability (GR&R) for flux inspection was used. The ANOVA GR&R method is a standard statistical technique used to analyze the measurement error and other sources of variability of data in a measurement system. Using this method a metrology tool is considered capable if there is a gage error of less than 10%.

In this case the ANOVA GR&R utilised three different operators, three trials per operator and twelve total parts. The parts in this experiment are BGA packages with a pattern of 600 microns flux pads on a 1.27 mm Ni/Au pitch ball grid. The parts are held in a tray and flux deposition takes place using a screen printer. Height and volume are the critical responses obtained on the inspection tool being evaluated. To execute the GR&R operator A runs the first trial of twelve parts in random order (i.e. operator A, trial 1, runs part 7, then part 2, then part 9, etc. until all twelve parts are measured). After the first trial the same operator runs the same twelve parts in a different randomised order (i.e. operator A, trial 2, runs parts 12, then part 1, then part 5, etc. until all twelve parts are measured.). The same applies for trial three again, the operator is held constant and the parts are randomised in yet a different way. This entire process is repeated for operators B and C, each trial using the same parts and a new random order in which to measure the parts. This technique serves to evaluate a metrology tool and prove its capability irrespective of operator, parts or the error of replication due to the gage.

Ball shear testing is a destructive test used to assess joint integrity. A shear strength of 1 kg is recognised as an industry standard and is a commonly accepted passing criteria for a 0.762 mm sphere with a 600 microns pad as tested. An experiment was done to measure flux amount as printed on BGA pads and assess the volumetric correlation to ball shear, voiding, and wetting results. Again, the parts in this experiment are BGA packages with a pattern of 600 microns flux pads on a 1.27 mm Ni/Au pitch ball grid. The flux placement was done with a screen printer and the solder spheres were placed using gravity placement. Reflow is done in an oxygen controlled standard convection furnace. A 30 mil (0.762 mm) shear tip with a 4 mil shear height was utilised to complete shear tests on the eutectic spheres after reflow.

A gage is determined acceptable if the gage error is less than 10%. If the gage error is between 10% and 30% it may be acceptable based upon importance of application, cost of gage, cost of repairs, etc. Gage error is calculated as follows.

Gage Error (%)=RR/TV*100 where RR=Gage R&R,
TV=total variation.

Table 1 below shows the height data obtained during the GR&R by the three operators over the three trials. The purpose of analysis in this format is to view the data pictorially. If the pattern of the three trials is the same across the three operators then it can be concluded that the process is repeatable independent of operator intervention and trial number. Due to the screen printing technique used to place flux it is expected that each pad will not have exactly the same flux deposition height (and/or volume). The error bars associated with the height intensity measurement for each part (nested in x-axis) shows that for the parts measured each operator obtained a repeatable measurement and from operator to operator this appears to be consistent as well. Numerically the data can be represented as shown in Table 1 which shows the overall gage error to be 5.19% for the response, in this case height intensity. A gage error value of 5.19%, which is <10%, demonstrates that the tool is capable of obtaining a repeatable height measurement within 5.15 σ. The 5.15 represents 99% of the measurements for a normal distribution.

TABLE 1

GR&R Height Measurement Unit Analysis (Intensity based).

| | |
|---|---|
| Gage R&R (RR) | 5.84255 |
| Total Variation (TV) | 112.65567 |
| Sigma Multiple | 5.15000* |
| Tolerance | 20.00000** |
| Gage Error (RR/TV*100) | 5.19% |

*5.15 represents 99% of the measurements for a normal distribution.
**A tolerance of +/− 10% was selected. In the case of height the average intensity obtained from data analysis is 137.6, therefore this equipment is accurate within +/.13.7 gray levels of height.

Similarly, Table 2 shows a gage error value of 2.396% for volume intensity, which is less than 10%, therefore indicating that the gage is capable of obtaining repeatable volume measurements within 5.15 σ.

TABLE 2

GR&R Volume Measurement Unit Analysis (Intensity based)

| | |
|---|---|
| Gage R&R (RR) | 9.23567 |
| Total Variation (TV) | 385.40672 |
| Sigma Multiple | 5.15000* |
| Tolerance | 20.00000** |
| Gage Error (RR/TV*100) | 2.396% |

Ball shear data is utilised to identify joint strength with lower shear force used to identify a weak solder joint. Again, a 1 kg shear force is accepted as a minimum shear force for acceptable joint integrity. Flux volume contributes to the integrity of the solder joint on a BGA pad. Similar studies have found that for chip scale processes (CSP), volumetric measurements are considered critical to correlate paste joint integrity. Therefore, it was predicted that flux volume and ball shear force values should correlate. From FIG. 15 it is evident that there is indeed a correlation between measured volume intensity and shear strength.

TABLE 3

Shear and Volume data

| Pad | Volume (intensity) | Shear (kg) |
|---|---|---|
| 1 | 3 | 814.9 |
| 2 | 22 | 1317.3 |
| 3 | 23 | 1535.5 |
| 4 | 44 | 1737.9 |
| 5 | 77 | 1429.5 |
| 6 | 97 | 1589.3 |
| 7 | 103 | 1330.4 |
| 8 | 109 | 1941.5 |
| 9 | 128 | 1795.3 |

TABLE 3-continued

Shear and Volume data

| Pad | Volume (intensity) | Shear (kg) |
|---|---|---|
| 10 | 148 | 1937.1 |
| 11 | 188 | 1697.8 |

It will be apparent from the above that flux volume had a direct effect on solder shear strength, and thus inspection of volume before solder application is of major benefit.

It will be appreciated that the invention provides a method and system for inspecting dielectric materials in electronics production to provide comprehensive in-line feedback for control of material deposition. This allows process errors to be very quickly corrected before significant downstream faults develop. The level of information obtained is sufficient for process control in both the circuit and chip-scale production industries. Another major advantage is that these advantages are achieved without the need to add a process step, or to introduce additional materials and ensure that this does not have an adverse effect on the process. The inspection method and system of the invention are almost totally non-invasive The invention is not limited to the embodiments described but may be varied in construction and detail within the scope of the claims.

What is claimed is:

1. A method of inspecting a dielectric material deposited on a substrate in an electronics production process, the method comprising the steps of:
    (a) directing radiation excitation of one wavelength at the dielectric material to cause radiation emission of a different wavelength by inherent fluorescence of the dielectric material,
    (b) detecting the radiation emission, and
    (c) processing said radiation emission to generate output data; and
    step (b) includes determining radiation emission intensity data, and step (c) includes processing said radiation emission intensity data to generate output data indicating volume of the dielectric material according to a relationship between radiation emission intensity and dielectric material volume.

2. The method as claimed in claim 1, wherein step (b) comprises determining intensity data across the material surface and step (c) comprises generating output data indicating a defect if non-uniformity above a pre-set level occurs over the material surface.

3. The method as claimed in claim 2, wherein said output data includes an indication of presence of a void within the material or an unacceptable material height non-uniformity.

4. The method as claimed in claim 1, wherein the excitation wavelength is in the range of 320 nm to 390 nm.

5. The method as claimed in claim 1, wherein the emission is detected after filtering out radiation outside of an emission wavelength range from a sensor field of view.

6. The method as claimed in claim 5, wherein radiation having a wavelength below 420 nm is filtered out.

7. The method as claimed in claim 1, wherein the steps (a) and (b) are carried out simultaneously and there is activation of the excitation only during emission detection.

8. The method as claimed in claim 7, wherein the excitation is generate by switching LEDs.

9. The method as claimed in claim 1, wherein the duration of excitation is less than 100 ms.

10. The method as claimed in claim 9, wherein the duration of excitation is in the range 5 ms to 80 ms.

11. The method as claimed in claim 1, wherein the method comprises the further steps of directing visible radiation at the material, sensing reflected visible radiation, and using said sensed visible radiation to determine material position with respect to fiducials.

12. The method as claimed in claim 11, wherein said visible radiation is generated by near-on-axis LEDs with respect to the sensing axis.

13. The method as claimed in claim 1, further comprising the step of providing in-line process control feedback to a flux dispensing station to avoid downstream processing defects.

14. The method as claimed in claim 1, wherein the material is flux deposited on a chip substrate in a BGA or flip chip production process.

15. The method as claimed in claim 1, wherein the material is a component adhesive.

16. An inspection system comprising:
    a radiation source for directing one wavelength of radiation excitation at a dielectric material to cause radiation emission of a different wavelength by inherent fluorescent emission in the dielectric material,
    a sensor for detecting the inherent fluorescent emission of the dielectric material, and
    an image processor having means for determining emission intensity data from the detected inherent fluorescent emission of the dielectric material and for generating output data indicating volume of the dielectric material according to a relationship between said emission intensity data and dielectric material volume.

17. The inspection system as claimed in claim 16, wherein the radiation source and the sensor are mounted on an inspection head of a robotic gantry system.

18. The inspection system as claimed in claim 16, wherein the system further comprises a filter for blocking non-emission radiation from the sensor.

19. The inspection system as claimed in claim 16, wherein the radiation source comprises means for emitting excitation at a wavelength in the range of 320 nm to 390 nm.

20. The inspection system as claimed in claim 16, wherein the image processor is programmed with excitation intensity data derived from monitoring excitation and responsive emission from a standard fluorescent material.

21. A method of inspecting a dielectric material deposited on a substrate in an electronics production process, the method comprising the steps of:
    (a) directing radiation excitation at the material to cause radiation emission by inherent fluorescence of the material,
    (b) detecting the emission, and
    (c) processing said emission to generate output data; and
    step (b) includes determining emission intensity data, and step (c) includes processing said intensity data to generate output data indicating volume of the material according to a relationship between intensity and material volume, and
    a direction of excitation being at an angle of greater than 50° from a sensing axis to minimize sensing of reflected unwanted radiation.

22. The method as claimed in claim 21, wherein the angle is between 55° and 80°.

23. A method of inspecting a dielectric material deposited on a substrate in an electronics production process, the method comprising the steps of:
- (a) directing radiation excitation at the material to cause radiation emission by inherent fluorescence of the material,
- (b) detecting the emission, and
- (c) processing said emission to generate output data; and
- step (b) includes determining emission intensity data, and step includes processing said intensity data to generate output data indicating volume of the material according to a relationship between intensity and material volume,
- the dielectric material being solder flux, and the method being carried out on the solder flux before application of solder.

24. A method of inspecting a dielectric material deposited on a substrate in an electronics production process, the method comprising the steps of:
- (a) directing radiation excitation at the material to cause radiation emission by inherent fluorescence of the material,
- (b) detecting the emission, and
- (c) processing said emission to generate output data; and
- step (b) includes determining emission intensity data, and step includes processing said intensity data to generate output data indicating volume of the material according to a relationship between intensity and material volume, and
- the dielectric material being solder flux, and the material being solder flux deposited on a circuit board in a SMT production process.

25. An inspection system comprising:
- a radiation source for directing radiation excitation at a wavelength to cause inherent fluorescent emission in a dielectric material,
- a sensor for detecting inherent fluorescent emission, and
- an image processor having means for determining emission intensity data from the detected emission and for generating output data indicating volume of the material according to a relationship between said emission intensity and material volume,
- the radiation source being mounted to direct the excitation at an angle of in excess of 50° to the sensor axis.

26. The inspection system as claimed in claim 25, wherein the radiation source comprises a ring of LEDs mounted for low-angle diffuse illumination of the material and the sensor is mounted for positioning vertically above the material.

27. An inspection system comprising:
- a radiation source for directing radiation excitation at a wavelength to cause inherent fluorescent emission in a dielectric material,
- a sensor for detecting inherent fluorescent emission, and
- an image processor having means for determining emission intensity data from the detected emission and for generating output data indicating volume of the material according to a relationship between said emission intensity and material volume,
- a visible light source,
- a visible light sensor mounted to sense visible light reflected from the material, and
- means in the image processor for determining location of the material with respect to fiducials.

* * * * *